(12) United States Patent
Miura

(10) Patent No.: US 6,778,942 B2
(45) Date of Patent: Aug. 17, 2004

(54) MONITORING METHOD FOR MACHINE TOOL

(75) Inventor: Kenji Miura, Ageo (JP)

(73) Assignee: Softrox Co., Ltd., Usuki (JP)

( * ) Notice: Subject to any disclaimer, the term of this patent is extended or adjusted under 35 U.S.C. 154(b) by 0 days.

(21) Appl. No.: 10/142,904

(22) Filed: May 13, 2002

(65) Prior Publication Data

US 2002/0173935 A1 Nov. 21, 2002

(30) Foreign Application Priority Data

May 18, 2001 (JP) ........................................ 2001-149616

(51) Int. Cl.⁷ ......................... G06F 11/30; G21C 17/00
(52) U.S. Cl. ...................................................... 702/182
(58) Field of Search ................................. 702/182, 183, 702/185, 189, 82, 83, 84; 700/117, 119, 120, 121

(56) References Cited

FOREIGN PATENT DOCUMENTS

JP          05-116056       *   5/1993

* cited by examiner

*Primary Examiner*—Michael Nghiem
(74) *Attorney, Agent, or Firm*—Oliff & Berridge, PLC

(57) ABSTRACT

A monitoring device for a machine tool, which monitors operations in work machining to increase the precision level of the work yield. To monitor a load current supplied to a machining motor in 1-cycle units, sampling points are taken at shorter intervals along the time axis of the machining in areas where the machining is complex. In areas where the machining is simple sampling points are taken at longer intervals. At each sampling point the sampling data are stored and undergo numerical processing. The load current measured value is compared to determine whether the measured value is within a range of limits determined by a standard deviation value calculated from the sampling data at each sampling point. Determination as to defective/non-defective is performed at each sampling point on the basis of the range of limits which model the shape of the work.

1 Claim, 10 Drawing Sheets

FIG. 9

| POINT | SHEET C-1 | SHEET C-2 | SHEET C-3 | SHEET C-4 |
|---|---|---|---|---|
| 449 | RETRIEVE LARGEST VALUE OF 449 POINT OF 500 CYCLE | OBTAIN LARGEST VALUE OF (C-1, 449) USING FORMULA Y=AX+B | INPUT ACTUALLY MEASURED VALUE | SUBTRACT (C-3, 449) FROM (C-2, 449) AND FORWARD DIFFERENCE FROM RS-232C IN BINARY FORMAT |
| 450 | RETRIEVE SMALLEST VALUE OF 450 POINT OF 500 CYCLE | OBTAIN SMALLEST VALUE OF (C-1, 450) USING FORMULA Y=AX+B | INPUT ACTUALLY MEASURED VALUE | IF (C-2, 450) > (C-3, 450), THEN SEND COMMUNICATION INDICATING LOWER LIMIT ABNORMALITY VIA ETHERNET (R) |
| 451 | RETRIEVE AVERAGE VALUE OF 451 POINT OF 500 CYCLE | | INPUT ACTUALLY MEASURED VALUE | IF (C-1, 451) > (C-3, 451), THEN SEND CORRECTION AMOUNT VIA ETHERNET (R) |
| 452 | CALCULATE STANDARD DEVIATION AND AVERAGE OF 452 POINT OF 700 CYCLE | MULTIPLY STANDARD DEVIATION COMPUTED AT (C-1, 452) BY 3 TO OBTAIN 3σ, AND OBTAIN UPPER LIMIT VALUE AS AVERAGE (C-1, 452)+3σ | INPUT ACTUALLY MEASURED VALUE | IF (C-2, 452) < (C-3, 452), THEN FORWARD DIFFERENCE FROM RS-232C IN BINARY FORMAT |
| 453 | CALCULATE STANDARD DEVIATION AND AVERAGE OF 453 POINT OF 700 CYCLE | MULTIPLY STANDARD DEVIATION COMPUTED AT (C-1, 453) BY 3 TO OBTAIN 3σ, AND OBTAIN LOWER LIMIT VALUE AS AVERAGE (C-1, 453)−3σ | INPUT ACTUALLY MEASURED VALUE | IF (C-2, 453) > (C-3, 453), THEN FORWARD DIFFERENCE FROM RS-232C IN BINARY FORMAT |

MONITORING METHOD FOR MACHINE TOOL

BACKGROUND OF THE INVENTION

1. Field of the Invention

Conventionally, machine accuracy must be enhanced to increase yield of products manufactured by a machine tool. In order to monitor conditions while the machine is operating, an abnormality is detected either by directly measuring mechanical displacement of a working drive shaft or by measuring a drive current. The present invention relates to a monitoring method for a machine tool, in which the drive current is measured in a continual fashion so as to learn the condition of the tool.

The present invention is applied in a tool performing a cyclical operation of operating, standing by, operating, standing by. Examples of such tools include an injection mold, a cutting device, a press, a conveyor device and the like.

2. Description of the Related Art

Conventionally, when an object is to be machined by a machine tool, a copying operation is performed based on design dimensions. When this is performed, the value of the drive current is measured and monitoring is performed to monitor whether the drive current enters an abnormal range. For example, in a case where a cylindrically shaped manufactured product shown in FIG. 12 is to be produced, the rotation of a drive motor is started by a machining start signal to make a machining table start moving.

The starting current of the machine tool drive motor is set at a high value so that the drive motor is maintained in a no-load state and the current flows at a fixed level until the areas of the product which are to be machined are set.

As shown in FIG. 11, the product has areas which are machined by different tools A, B and C, and the frequency with which each tool is switched varies according to the wear conditions of each tool. Further, the switching of the tools is performed in the state when there is no machining load.

When the machining ends, the motor rotation is topped by also using a break. Therefore, the value of the electric current increases.

The machining conditions are managed as follows. When a drive motor having an output which is appropriate for the product is used, machining operation affects a current supplied to the drive motor. Thus, the machining conditions can be monitored by monitoring the current to the drive motor. Accordingly, it is possible to obtain data to raise the precision level of the product or to improve yield.

An example method for monitoring 1 cycle (all sections of 1 cycle) of the machining of the product is as follows. Equally spaced graduations are made along a time axis and measurement points are set at these graduations. Measurement values are stored as a time series. Digital data from a first cycle is used as a temporary standard of reference to be compared against the digital data from the next repeated cycle with regard to each sampling point, and a greatest value and a smallest value regarding each sampling point is stored. Thereafter, measurements are performed repeatedly, and operations are performed to replace the greatest values and the smallest values as needed to obtain the greatest value and the smallest value from each sampling point. Then, as shown in FIG. 12, data of the greatest values and data of the smallest values for all points are strung together and a pattern of a greatest value waveform (upper limit) M and of a smallest value waveform (lower limit) m are set, whereby machining abnormalities can be monitored visually.

That is, the greatest value waveform M and the smallest value waveform m are displayed on a display section of the machine device, and when the work operation is being performed, the actually measured values are visually checked within this pattern. Thus, an abnormality can be detected when an actual measured waveform R crosses the greatest value waveform M or crosses the smallest value waveform m.

Thus, data from for example 1000 cycles are drafted out one on top of the other to obtain the greatest value waveform and the smallest value waveform, whereby the monitoring of the machining status becomes effective.

However, when machine parts are machined in an automobile factory, machining operations easily exceed 1000 cycles in one day. That is, when the time used to machine one part is 60 seconds, the number of cycles in 24 hours of continuous operation is 60×24=1440 cycles. With this many machining cycles, 1000 sample numbers is insufficient to learn the state and precision level of the machine. This is because when the number of sample measurements is too small, elements of chance become great in the measurement operation, such as an occurrence of a random large (or small) value, or occurrence of atypical stability during the measurement. Therefore, it would be desirable to take an extraordinarily large number of sample measurements; however, when using the method of drafting out the data on top of each other, there is an opposite effect such that when an extraordinarily large number of sample measurements is taken, data which is taken during times of instability or taken under bad conditions is mixed in as well, thus making it difficult to perform precise monitoring.

Further, in the conventional art, the permitted range for the machining was set as a succession of upper limit data and a succession of lower limit data. As a result, a quick response could not be made when the abnormality was detected. When monitoring was attempted by taking many sampling points from complex machining areas of the product occurring in one cycle, data from other complicated machining areas of the product and data which takes the entire product into account become insufficient. Therefore, it has been necessary to provide more monitoring devices which are set with multiple settings.

SUMMARY OF THE INVENTION

The present invention has as an object to provide a monitoring method for a machine tool, in which sample measurement points are arranged in an appropriate manner for each complex machining area and for each simple machining area of a product machined in a work operation process to thereby prepare monitoring data and in which work machining is monitored using the monitoring data.

In order to achieve the above-mentioned object, the invention according to a first aspect of the present invention is characterized in that: an amount of change in one cycle from the beginning until the end of the operation process is converted into a readable signal; sampling pointss are set in response to changes in the signal, and sampling data that are measured across a plurality of cycles are saved; and for each sampling point a standard deviation value is obtained and program processing is performed; and the actually measured values obtained on the signal are compared against the standard deviation values to monitor the presence/absence of an abnormality in the operation process.

In one example of the above-mentioned configuration, at important parts of one cycle of the signal change the signal change is sampled at short intervals (ex., 1 ms), and at parts of the cycle which are not important the signal change is sampled at longer intervals (ex., 10 ms), and these data are saved.

According to a second aspect of the invention, in the invention according to the first aspect, the actually measured values of the work operation are monitored at each sampling point, and depending on whether the actually measured values are in a normal or an abnormal state, program processing is performed using the data from the sampling point.

According to a third aspect of the invention, there is provided a method for monitoring a load current supplied to a machining motor of a work machining device in 1-cycle units running from the start of the machining to the end of the machining, characterized in that for areas where the shape of the work to be machined is complex, sampling points are set at shorter intervals along a time axis of the machining, and for simple machining areas the sampling points are set at longer intervals along the time axis of the machining, and the sampling data at each sampling point are individually stored into a CPU storage section and undergo numerical processing according to a program which is consistent with the purpose of the work.

In a fourth aspect of the present invention, in the invention according to the third aspect, the machining areas are determined to be the complex machining areas or to be the simple machining areas based on the sampling data from previous and subsequent machining areas without relying on the shape of the work, and the areas which are to be sampled along the time axis are determined based on this determination.

In a fifth aspect of the invention, in the invention according to the third aspect, the number of sampling points for the complex machining areas or for the simple machining areas are determined for each complex machining area or simple machining area based on data of the shape of the work.

In a sixth aspect of the invention, there is provided a method for monitoring a load current supplied to a machining motor of a work machining device in 1-cycle units running from the start of the machining to the end of the machining, characterized in that a plurality of actually measured values of the load current at each area of the work after performing a plurality of the cycles are collected together per sampling point and stored as the sampling data; and an average value of the data and a standard deviation value for each sampling area are obtained, and the average value or the standard deviation value is compared against the actually measured value of the load current, to thereby perform the monitoring.

In a seventh aspect of the present invention, in the invention according to the sixth aspect, an upper limit value and a lower limit value are set as the standard deviation value multiplied by a coefficient, and the actually measured values obtained on the work are monitored by being compared against a permissible actual measurement range within the upper and lower limit values, to thereby perform the monitoring.

BRIEF DESCRIPTION OF THE DRAWINGS

In the accompanying drawings:

FIG. 9 is a chart illustrating a structure of the memory section, which shows a part of content at sampling points;

DETAILED DESCRIPTION OF THE PREFERRED EMBODIMENTS

Hereinafter, explanation is made of an embodiment of the present invention, based on the attached drawings.

In the present invention, the sample data used for the comparison purpose to monitor the machine tool is sampled at short intervals at important parts of the work, thus increasing the volume of-information regarding those parts. In areas where the change in the shape of the work occurs slowly and the changes in the data are small, the sampling time intervals are long and the sample data is measured and saved by minimal sampling.

Note that, in a case where there is no information about the shape of the work, the sampling time intervals are determined by detecting the amounts of change at each sampling point during the first cycle the first time the measurements are performed. In the subsequent cycle, the data from the first cycle serve as a base and adjustments are made as the data is taken. In the work shown in FIG. 3, the work is performed in three areas and the sampling time intervals for each area vary respectively. Further, the entire machining process of this work is divided into seven parts ① to ⑦, and a total of 1,900 sampling points are set.

Figure 2:
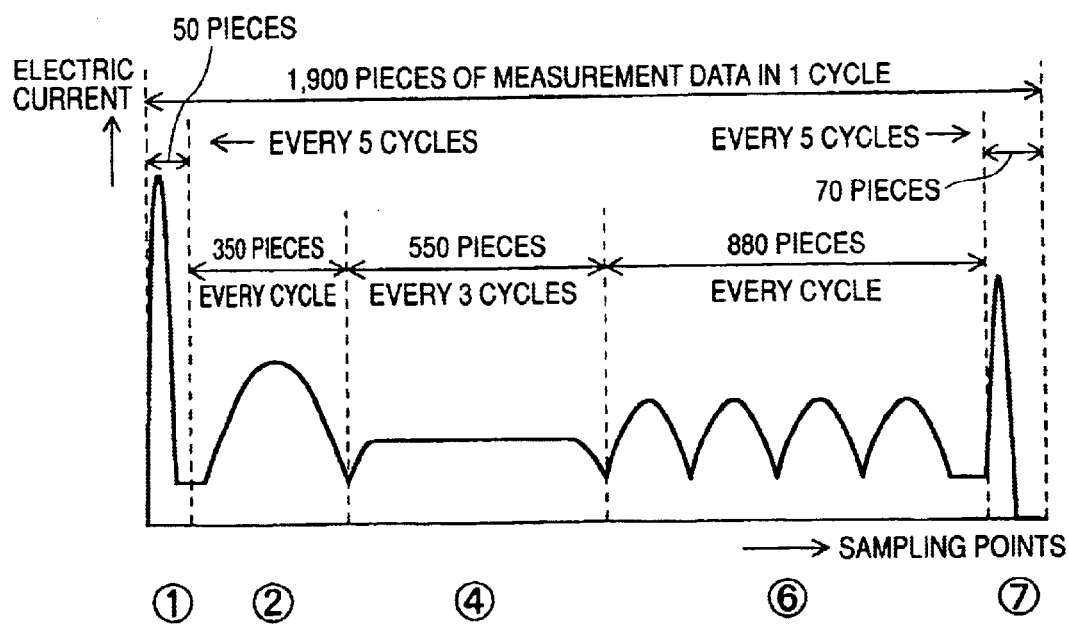
FIG. 2 is a graph showing a number of sample data according to the monitoring method shown in FIG. 1.
Figures 3, 4:
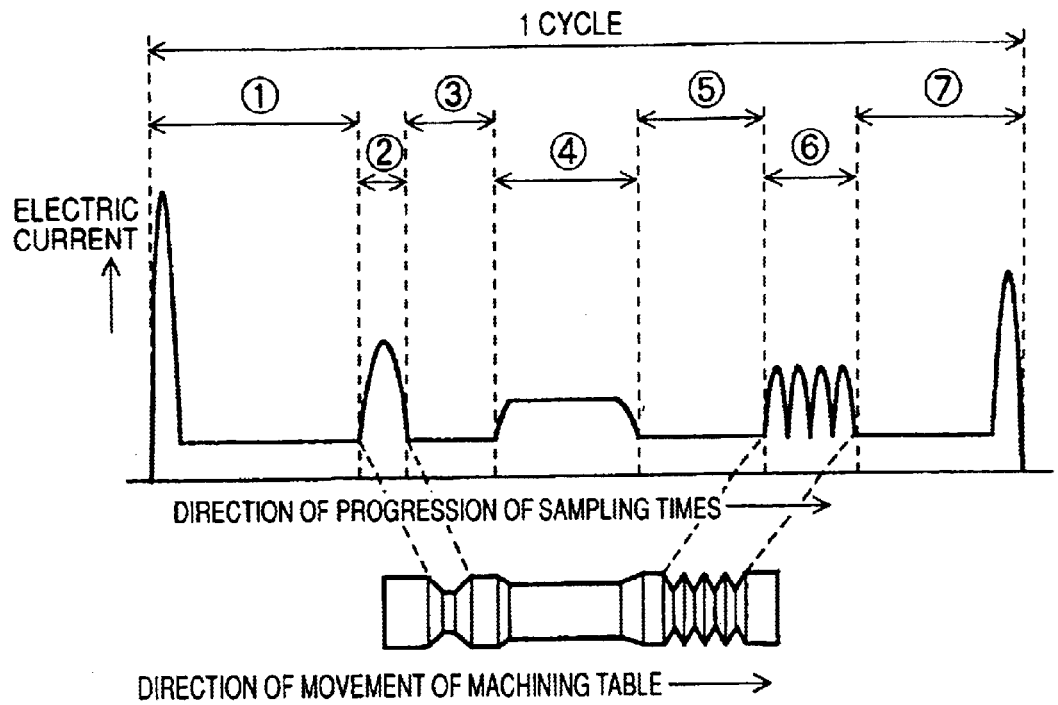
FIG. 3 is a graph showing sampling points in the work according to the monitoring method shown in FIG. 1.
FIG. 4 is a chart illustrating a structure of a memory section according to the monitoring method shown in FIG. 1.

As shown in FIG. 2 and FIG. 3, the sampling points include 50 areas in part ①, 350 areas in part ②, 550 areas in part ④, 880 areas in part ⑥, and 70 areas in part ⑦. It should be noted that machining is not performed in parts ③ and ⑤; therefore, sampling is not performed there.

Further, as shown in FIG. 4, parts ① and ⑦ are starting and ending parts, so the sampling is performed one time in 5 cycles, and in part ④ the sampling is performed one time in 3 cycles.

In parts ②and ⑥, the sampling is performed in every cycle.

Next, explanation will be made of each of the divisions ① through ⑦.

In division ①, the measuring is started by means of a pass trigger (a trigger in which an electric current flow is changed from the bottom to a top or from the top to the bottom with regard to set value 1) or by means of a start signal input from an external source. If the sampling time intervals from point 1 through point 50 are set at 100 ms, then division ① requires 5 seconds (100 ms×50=5 s).

In division ②, the measuring begins when mounting of the tool is finished and a machining start command is received. Since this area is an important part and since tool switching is performed every 200 pieces that machining is performed, the number of sampling points is increased. Therefore, from point 51 through point 400 (350 areas), the measuring is performed with the sampling time intervals set at 5 ms, and the measurements are stored in a memory section.

In division ③, the switching of the tool is performed by means of ATS (Automatic Tool Switching). Since the necessary tool is not at a fixed location, the time required for the ATS tool accommodating portion to move is not fixed. Therefore, the operation is advanced to division ④ by inputting a signal (command) which indicates the completion of the tool switching.

In division ④, the measuring starts when the mounting of the tool is finished and the machining start command is received. The load in this area is not great, and problems such damaging of the tools do not occur much, so the tool switching is performed every 600 pieces that machining is performed. Therefore, the sampling time intervals from point 401 through point 950 are set at 10 ms, and the measurements are saved into the memory section every 3 cycles.

In division ⑤, the same operations as in division ③ are performed.

In division ⑥, the measuring starts when the mounting of the tool is finished and the machining start command is received. This area is an important area, so the tool switching is performed every 100 pieces that machining is performed. Thus, fluctuations in the machining become great. Therefore, the sampling time intervals from point 951 through point 1830 are set at 3 ms, and the measurements from every cycle are saved into the memory section.

In division ⑦, the measuring is started by means of the pass trigger or by means of the start signal input from the external source. The sampling time intervals from point 1831 through point 1900 (70 areas) are set at 100 ms, and the measurements are saved into the memory section every 5 cycles. The time required for division ⑦ is 7 seconds (100 ms×70=7 s).

When the data is collected as described above, a number of data from given sample points are accumulated into the memory device that is connected to the machine tool, with the number of data to be collected being determined according to the number of samples taken in each of the divisions ①, ②, ④, ⑥ and ⑦, as shown in FIG. 4.

Further, as shown in FIG. 2, when the data from the divisions ①, ②, ④, ⑥ and ⑦ are converted into the waveforms, the shape of the wave is composed only of the parts which are to be machined.

Figure 5:
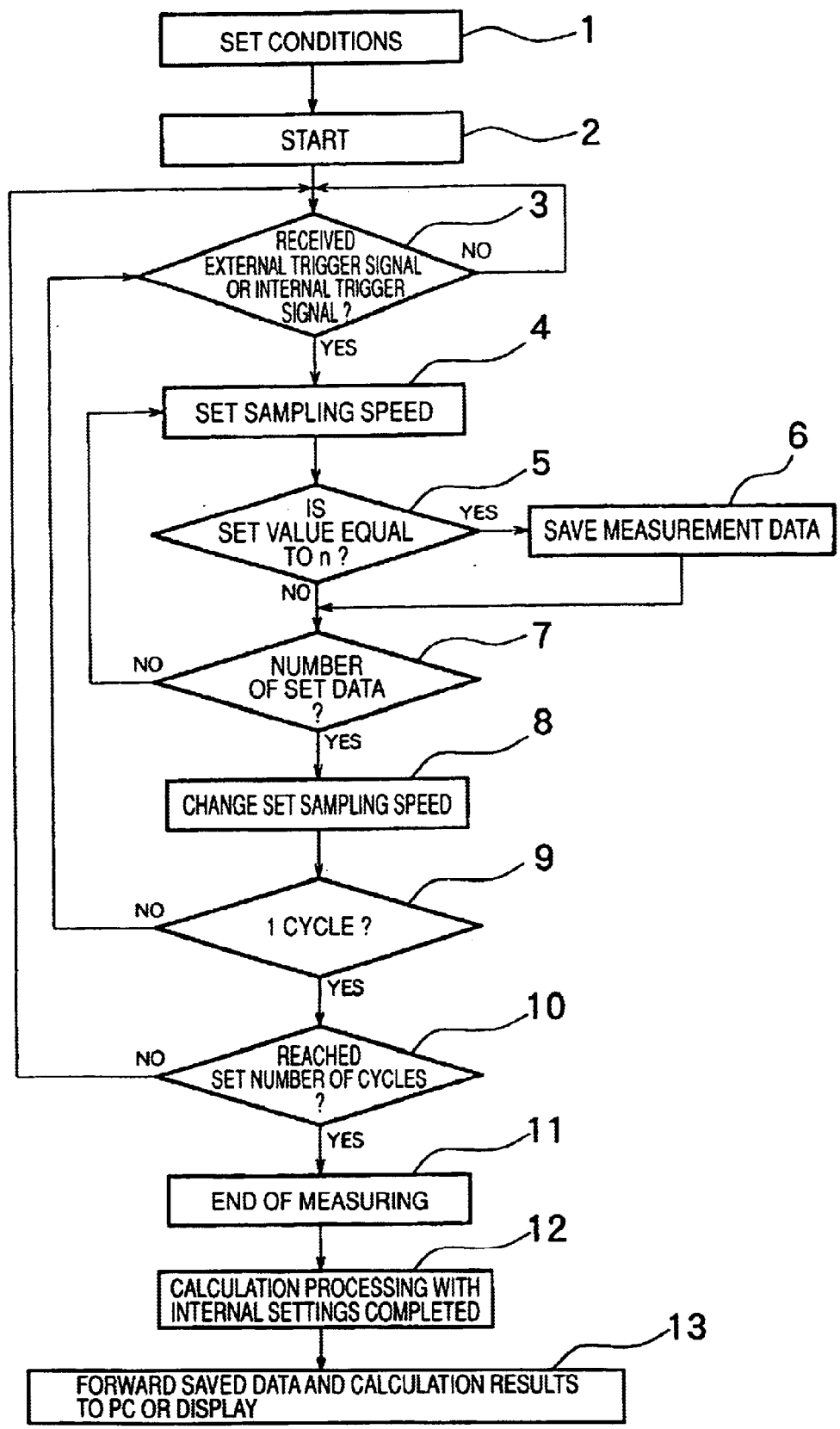
FIG. 5 is a flow chart showing operations in a setting cycle of the sampling, according to the monitoring method shown in FIG. 1.

Next, the sampling process will be explained with reference to FIG. 5.

First, when the conditions are to be set in step 1, the speed and number of times of the sampling are set according to the sequence of the processes. In step 2 the sampling process enters a sampling start state. In step 3 the process checks whether or not the pass trigger or another trigger has been inputted. If there is no input, then the process enters a standby state at this point.

At step 4 the sampling speed is set at one of 3 ms, 5 ms, 10 ms, and 100 ms, in accordance with the predetermined sequence of speeds. At step 5, it is determined whether or not the sampling point has been reached. If it has been reached (if YES), then a measurement is taken at step 6 and the sampling data is saved. Here, steps 4 through 7 are repeated according to a set value n, and the measurements are taken and saved.

The setting of n is performed as follows. When n=1, then the data from all the measurement cycles are saved. When n=2, then the data from every 2 cycles are saved. When n=5, the data from 1 cycle in every 5 cycles is saved. When n=X, then the data from 1 cycle in every X cycles is saved.

At step 7, the number of set data is checked, and if the number is equal to a fixed quantity, then the process advances to the next stage. If the fixed quantity is not satisfied, then the process returns to step 4 and repeats the collecting of the data.

In the case where the sampling quantity gets satisfied at the determined sampling speed, then, at step 8, the sampling speed is changed to the next speed in the sequence of speeds.

At step 9 it is determined whether or not 1 cycle's worth of data was able to be collected by the sampling series. In the case where this is not attained yet, the process returns to step 3 and the pass trigger is put into the standby state. If 1 cycle's worth of data is collected, then, at step 10, it is determined whether or not the data of the set cycles has been collected.

In step 10, in the case where all the data have been measured and saved, the measuring ends (step 11). If the data from all the set cycles has not yet been collected, then the process returns to step 3 and waits for the pass trigger.

If the measuring ends (step 11), then, at step 12, calculation processing is performed on the data, and, at step 13, the processed data is sent together with a command in a way which suits the reception capabilities of the receiving side.

Figure 6:
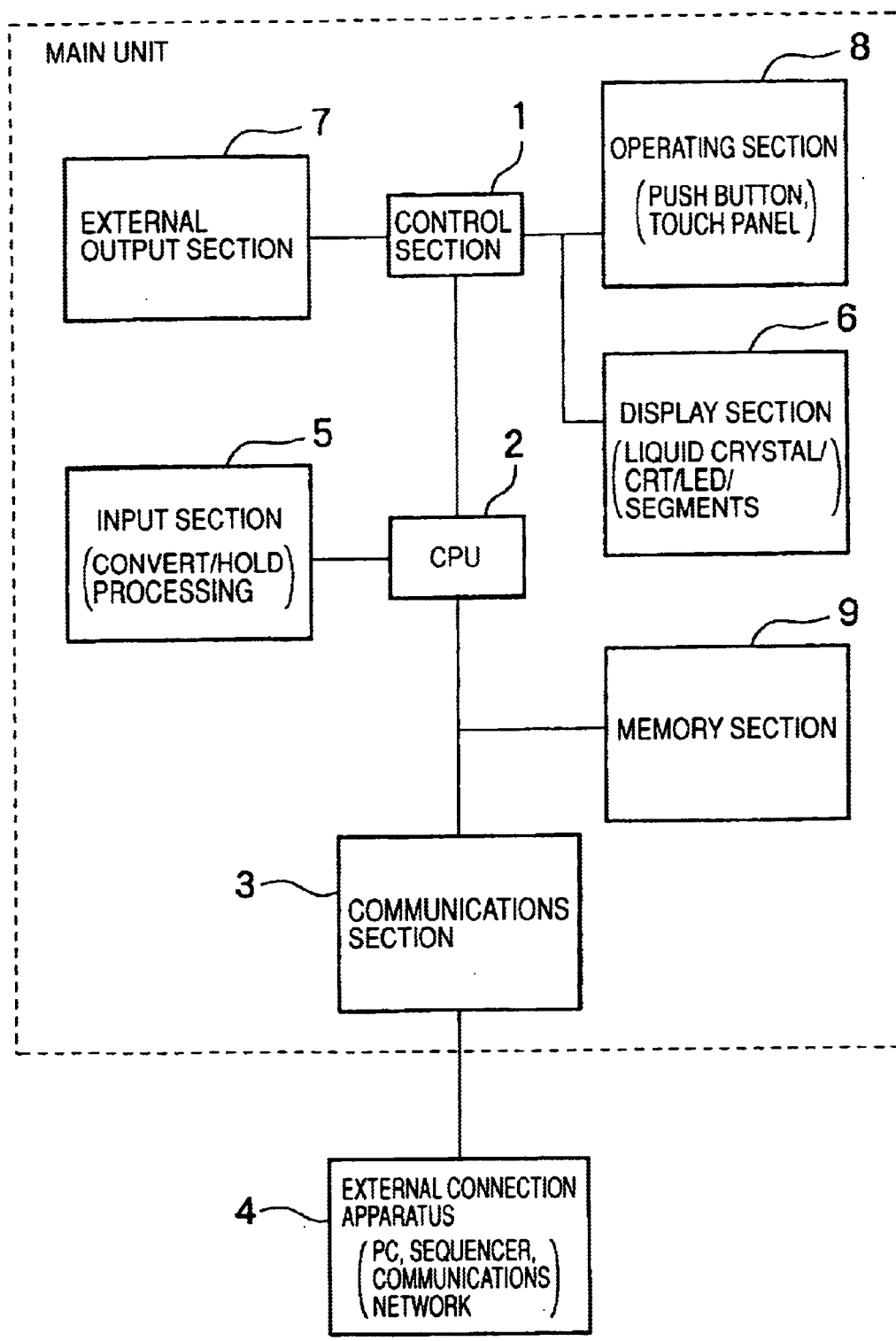
FIG. 6 is a block diagram of a main unit used in the monitoring method shown in FIG. 1.

As shown in FIG. 6, in a main unit of the monitoring device there is provided a control section 1 for controlling each section, and a CPU 2 performs the calculation processing on the data. A communications section 3 enables connection to an external personal computer 4, and facilitates monitoring and operation. The main unit is provided with an input section 5, a display section 6 and an output section 7, and there are provided an operating section 8 for operating the above, and a memory section 9 for storing the data of the actually measured values, the results of the calculations and the like.

Next, explanation will be made of preparation of a reference waveform which is compared with the actually measured values.

Figure 7:
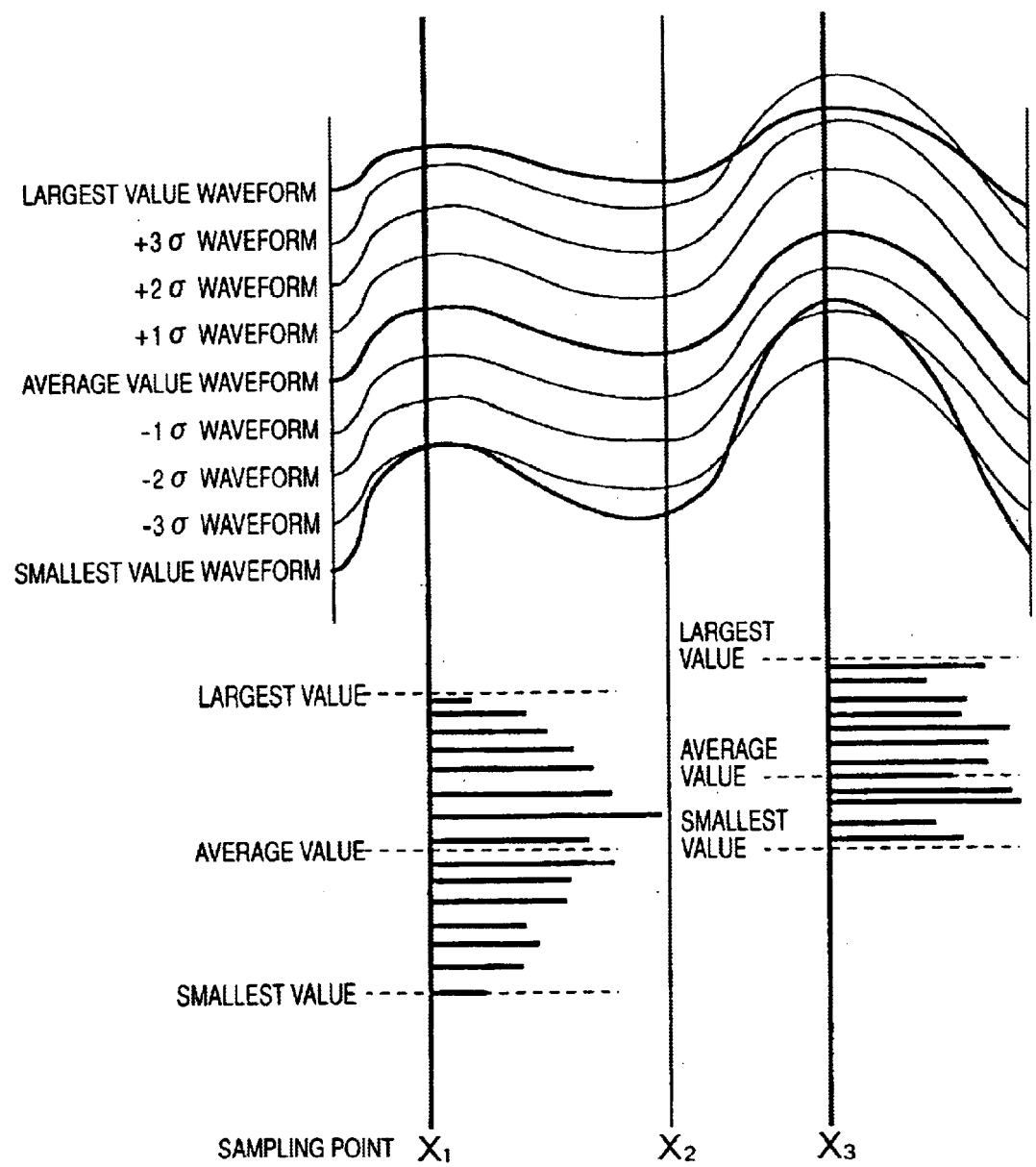
FIG. 7 is a diagram using waveforms and histograms to show relationships among average values, largest values, smallest values, and upper and lower limit values determined by standard deviation values.

As shown in FIG. 7, when the fragmentally measured and saved data from all the cycles, or from freely selected cycles, are represented as a histogram, it becomes possible to make a comparison of the average value, the largest value and smallest value obtained by means of a known method regarding each sampling point, against the actually measured values when they are measured.

Further, standard deviation processing is performed regarding each sampling point, to compute a standard deviation value (σ), and continuous 1 σ curves are drafted representing values of 1×σ at each sampling point connected along the points (i.e., an upper limit on the positive side of the average value waveform and a lower limit on the negative side thereof are made). As a result, even when the number of measurement times is small, it is still possible to obtain the 1 σ waveforms (i.e., the upper limit and lower limit value waveforms), which represent the status with higher precision than the conventional largest value waveform and smallest value waveform did.

Since the standard deviation values (σ) at each sampling point X1, X2 and X3 shown in FIG. 7 are different, the waveforms are not be parallel (i.e., not uniformly spaced), and the width between the upper and lower limit values must necessarily be narrower at the higher precision areas.

Therefore, the statistical method is used to set a statistical percent defective even without measuring all of the cycle numbers. That is, if the 1σ waveform is used, then approximately 68-70% of all the products come within the range and are considered good products.

Further, it is possible to draft continuous 2 σ curves drafted by connecting the values of 2×σ at each sampling point, and 3σ curves drafted by connecting the values of 3×σ at each sampling point. In addition to 1σ, 2σ and 3σ, the monitoring width can be the width of another coefficient multiplied by σ.

In the deviation value waveform based on the average value waveform, when the deviation value of ±3σ or greater is set, the waveform becomes more appropriate for the product than the conventional largest value waveform, in which the largest values were linked to each other. Thus, when this monitoring width is used, 99.8% of all the products come within the monitoring width and are considered good products.

Figure 1:
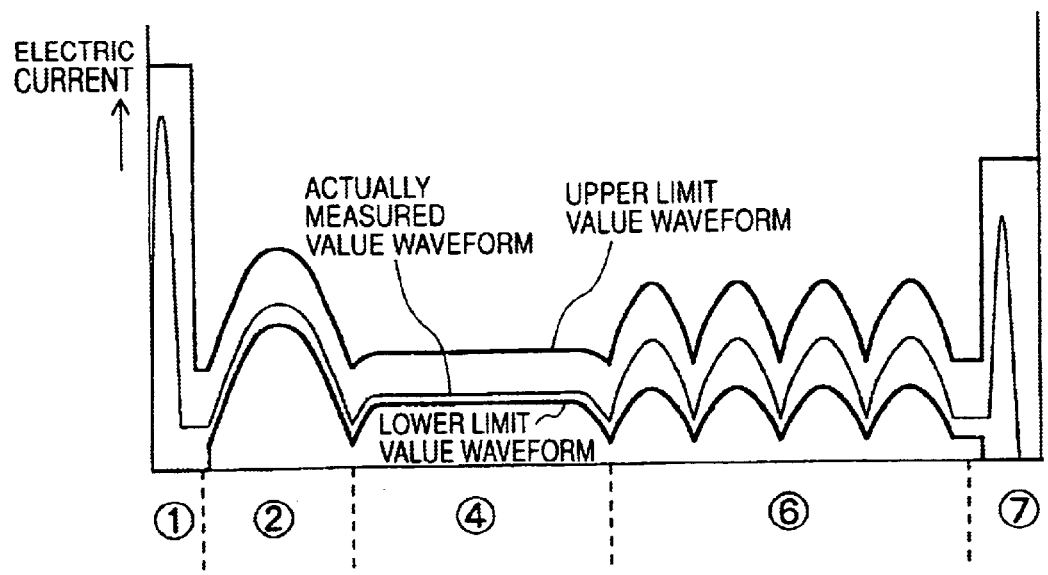
FIG. 1 is a graph of upper and lower limit value waveforms, depicting a monitoring method for monitoring a work load current according to-the present embodiment.

Therefore, the standard deviation value is multiplied by a value that would enable a percent defective close to the targeted percent defective. Thus, the upper limit value waveform and the lower limit value waveform can be created as shown in FIG. 1, and the work can be monitored.

Next, explanation will be made of functions of each sampling point.

Figure 8:
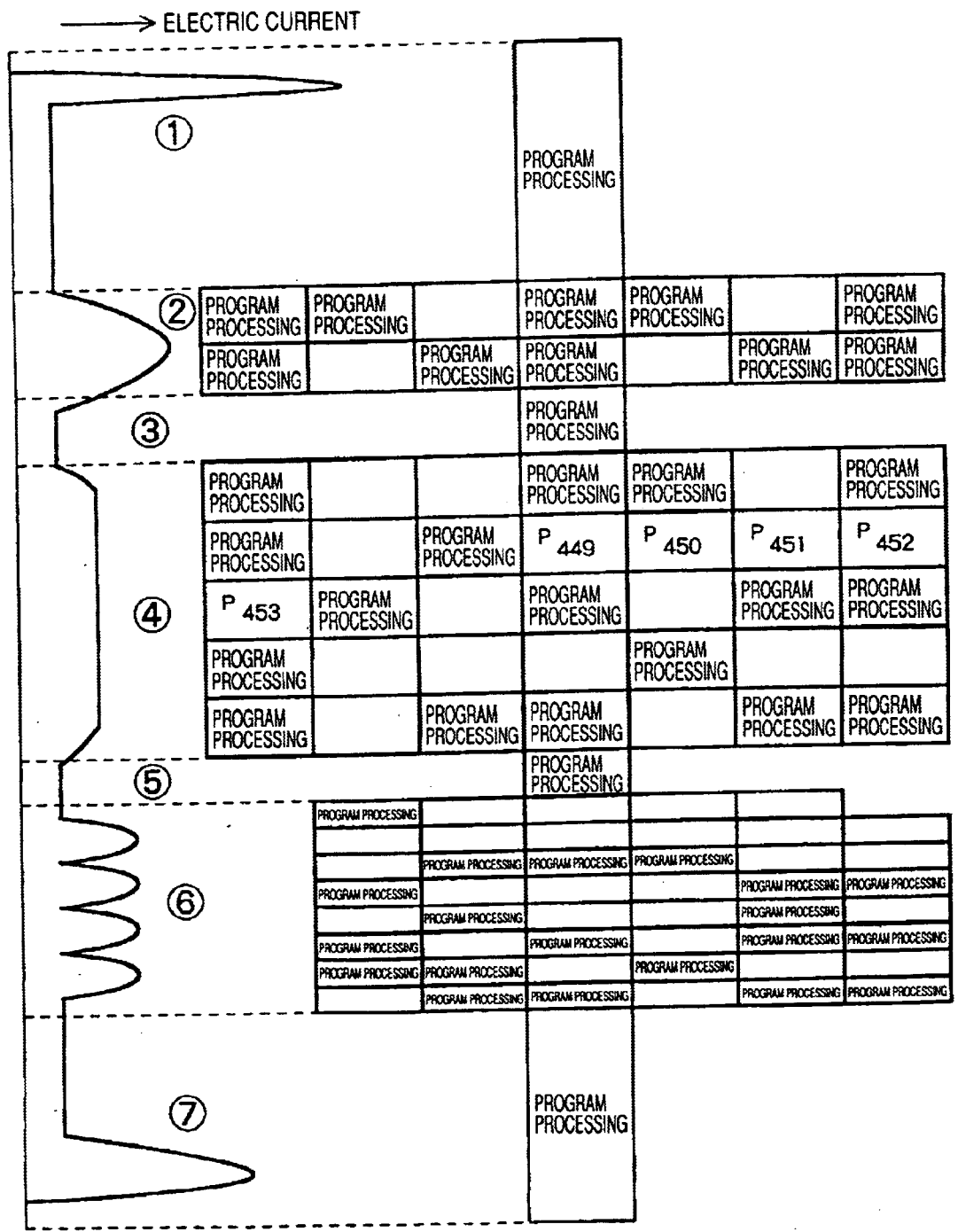
FIG. 8 is a diagram showing correspondences among sampling points and memory section areas according to the monitoring method shown in FIG. 1.

As shown in FIG. 8, the work monitoring regions ① through ⑦ have corresponding memory spaces provided to the main unit memory section, and the part corresponding to each sampling point has various elements built into it, such as an area containing a formula causing the program processing to be performed at that point, an area used just for a storage purpose, and the like. Since the machining is not performed at the parts in regions ③ and ⑤, the sampling is not performed there. However, during these periods, programs for switching of the tools by means of the ATS (Automatic Tool Switch device) and other such programs are executed.

In one example of the internal structure of the sampling points, the parts for sampling points 449 through 453 are provided with calculation sheets (sheet C-1) and (sheet C-2), a memory sheet (Sheet C-3) and a sheet for commands (sheet C-4), as shown in FIG. 8 and FIG. 9.

At sampling point 449 shown in FIG. 9, the actually measured value and the largest value are obtained, and these data are forwarded to the necessary place.

The internal constitutions of 4 consecutive sampling points are written below:

At sampling point 450, the actually measured value and the smallest value are obtained and the data are sent to the necessary place.

At sampling point 451, the actually measured value and the average value are obtained and a correction amount is sent.

At sampling point 452, the actually measured value and the standard deviation value are obtained, and the +3σ waveform to serve as the upper limit waveform is created. Also, the difference between standard deviation value and the actually measured value is sent.

At sampling point 453, the actually measured value and the standard deviation value are obtained, and the −3σ waveform to serve as the lower limit waveform is created. Also, the difference between standard deviation value and the actually measured value is sent.

In the formula Y=AX+B of FIG. 9, Y is electric current value, A is shape of an object to be measured, X is a point value and B is bias.

The above explains that each sampling point is provided with the data memory part, the calculation part-and the forwarding/communications part.

Figure 10:
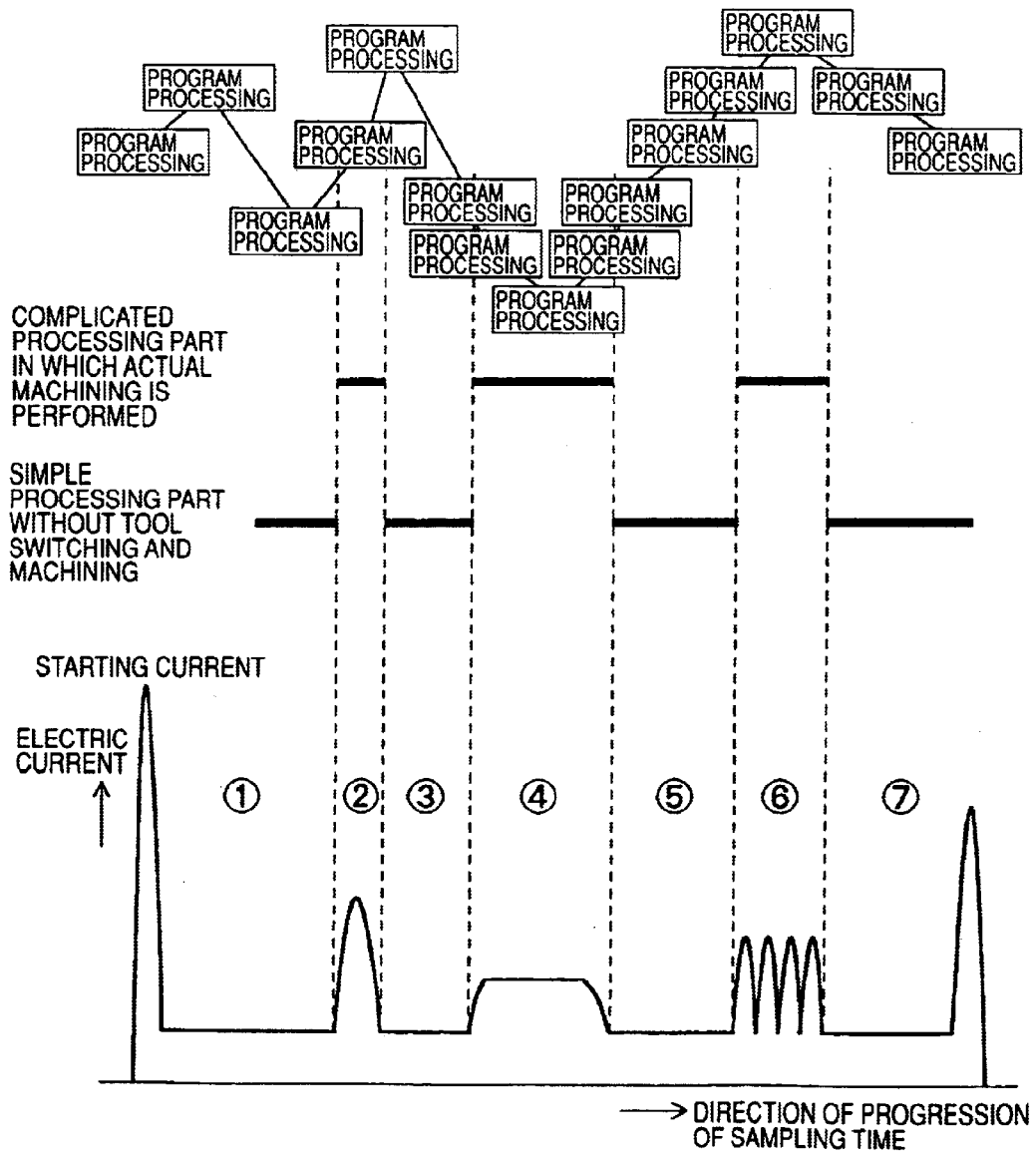
FIG. 10 is a schematic diagram showing monitoring performed by executing program processing at each sampling point, according to the monitoring method shown in FIG. 1.
Figure 11:
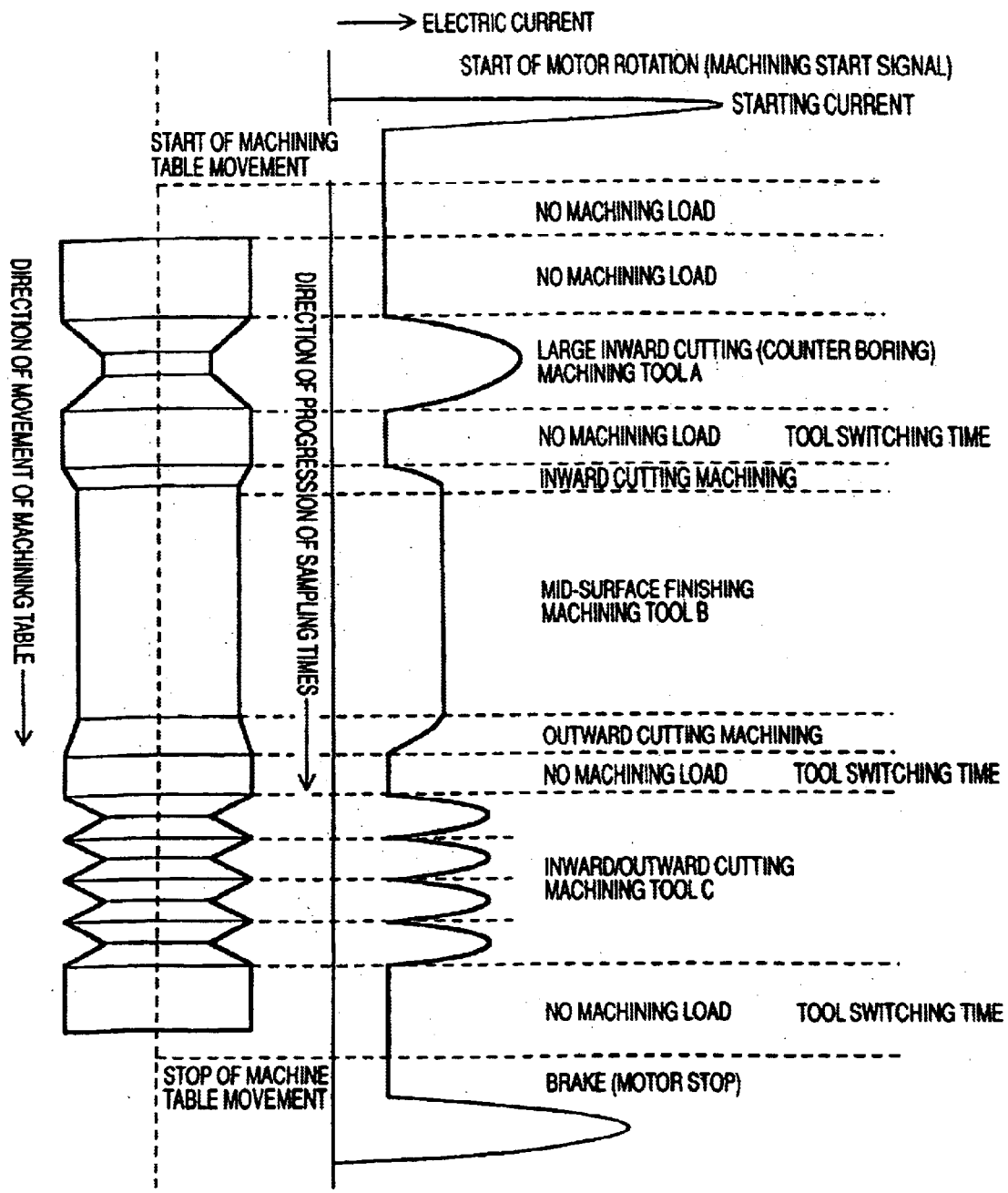
FIG. 11 is an explanatory diagram showing a conventional work procedure.
Figure 12:
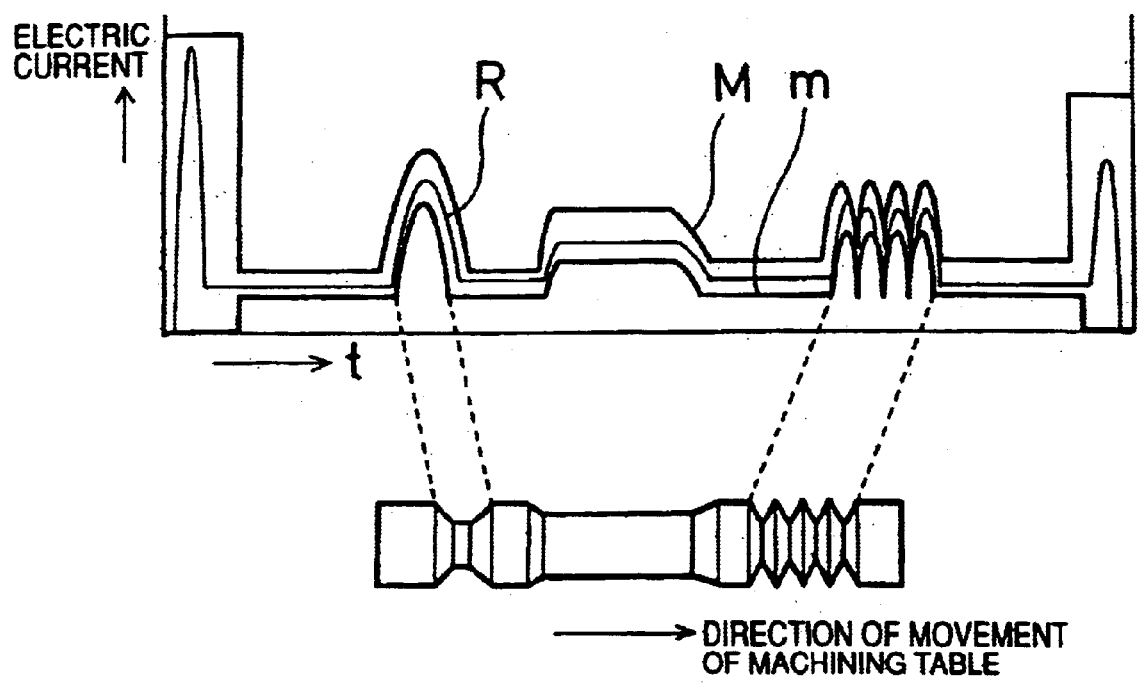
FIG. 12 is a schematic diagram for explaining the conventional work monitoring method in which the largest value waveform and the smallest value waveform are used.

As shown in FIG. 10, the actually measured value is stored at each sampling point and the calculation of the standard deviation value is performed as well. Further, the determination is made as to whether there is an abnormality with regard to the difference from the standard deviation value, and the forwarding/communication thereof is performed. Therefore, since the abnormality monitoring is performed at each point, a small number of samples suffices and detection of the abnormality can be performed quickly.

Further, in the monitoring screen numerical data is not simply compared. Rather, the actually measured value, the upper limit values and the lower limit values are color-coded through RGB processing, whereby it becomes easy to perceive the abnormality occurring in the machining precision, which is indicated by the actually measured value. This reduces the monitoring operation. Further, the monitoring width is also shown displayed according to a color arrangement such as blue for the 1σ waveform, green for the 2σ waveform, red for the 3σ waveform and orange for the waveform of the actually measured value. Thus, when a colored line is crossed, the level (1σ, 2σ or 3σ) of the abnormality can be judged.

Note that the standard deviation value indicates a relative comparison, whether the subject being measured is the electric current, a temperature, or something else. If changes in the monitored subject can be converted into a signal, this monitoring method can be used to manage the precision level.

Next, explanation will be made of a method of determining an occurrence of an abnormality, and processing performed at a time when the abnormality occurs.

First, it is assumed that the abnormality is determined to have occurred when the upper or the lower limit values are exceeded 1–N number of times consecutively, where N is a number set in advance. That is, in a case where the number of consecutive times is set as 3 and the actually measured values at 2 consecutive points are below the lower limit values, if the actually measured value at a third point rises above the upper limit value, then this is determined as abnormal. Further, if the actually measured value at the first point is greater than the upper limit, and at the next point it is within the monitored width between the upper and lower limit values, then if at the next two points it drops below the lower limit value but at the next five points it is within the monitored width between the upper and lower limit values, then this is not determined as abnormal. Normal mode setting (i.e., constant connection to personal computer or server):

When a notification regarding the abnormality is made to an external source at the time when the abnormality occurs, a command to perform the abnormality notification along with 1 cycle's worth of waveform data from when the abnormality occurred, are sent to a personal computer or to a server using Ethernet (R) or other such communications means. Then the monitoring state is resumed immediately. The actually measured values from the 1 cycle's-worth of waveform data from when the abnormality occurred are stored at each of the sampling points, and these data are constantly sent. Therefore, a quick report of the abnormality is possible simply by performing the abnormality determination. Delay setting (i.e., periodic connection to personal computer or server):

In the delay setting, an equipped memory circuit deletes past data existed before a determined time while memorizing existing data, and when an abnormal waveform is detected, monitoring is performed along with past data in a time before the abnormal waveform was detected, by using the memory circuit. When the notification regarding the abnormality is made to the external source at the time when the abnormality occurs, the command to perform the abnormality notification is sent to the personal computer or to the server using Ethernet (R) or other such communications means. Then the monitoring state is resumed immediately. The abnormality can be reported quickly in this setting, too, since the data is monitored at each of the sampling points.

Further, of the 1 cycle's-worth of waveform data from when the abnormality occurred, waveform data not exceeding the preset number M of waveforms (which is limited by the capacity of the internal memory) are stored into the internal memory. When more than M sets of abnormal waveform data have been collected, old waveform data is discarded and new data is saved. Thus, it is always possible to save M number of sets of the most recent waveform data. This data can easily be sent to the personal computer or to the server for reference.

The present invention is as described above. Thus, in the method according to the first aspect of the present invention, in a case where 1 cycle running from the start of the work operation to the end of the work operation is to be monitored, the standard deviation value for each sampling point in the cycle is obtained; the data indicating the upper and the lower limit values are prepared from the standard deviation values; and the actually measured value is monitored as to the presence/absence of the abnormality with respect to the monitored width between the upper and lower limit values. As a result, the work operation can be monitored with higher monitoring precision.

According to the second aspect of the present invention, in the method according to the first aspect, the abnormality can be detected at each sampling point. As a result, the abnormality can be discovered quickly.

In the method according to the third aspect of the present invention, with respect to the load current supplied to the work machining motor during the 1 cycle, the sampling points are taken at shorter intervals in the areas where the machining is complex, and the sampling data is prepared from these, and at each sampling point the sampling data undergo program processing and are stored in the memory section. As a result, an accurate data waveform which is easy to monitor can be created.

According to the fourth aspect of the present invention, in the method according to the third aspect, in the case where there is no design diagram regarding the shape of the work, the machining area is determined as being the complex area or the simple area based on the sampling data from the previous and the subsequent machining areas, and then the sampling is performed. As a result, the method is suited for sampling in a case of a work having unspecified configuration.

According to the fifth aspect of the present invention, in the method according to the third aspect, the number of sampling points for each of the complex machining areas and for simple machining areas is determined based on data pertaining to the shape of the work. As a result, accurate data can be obtained.

In the method according to the sixth aspect of the present invention, accurate data regarding 1 cycle of the machining load current from the beginning to the end of the work machining is used to obtain the average value and the standard deviation value for each sampling point, and the monitoring width as determined by monitoring the standard deviation value is used to compare the standard deviation value against the actually measured value of the load current, to thus perform the monitoring. As a result, precise monitoring consistent with the shape of the work can be performed.

According to the seventh aspect of the present invention, in the method according to the sixth aspect, the upper limit value and the lower limit value are set by multiplying the standard deviation value by an integer, and the actually measured values are compared against the permissible actual measurement range between the upper limit value and the lower limit value, to thus perform the monitoring. As a result, the yield of the work can be increased as compared with the case when the monitoring was performed using the conventional largest and smallest value waveforms.

What is claimed is:

1. A monitoring method for a machine tool, characterized in that standard deviation value of sampling data for each sampling point is obtained, and an upper limit value and a lower limit value are set as the standard deviation value multiplied by a coffficient and new sampling data are compared against the standard deviation value and/or the upper limit and lower limit value at each sampling point, to thereby monitor the presence/absence of an abnormality in the operation process wherein value of a load current supplied to a machining motor of a work machining device which machines a work is saved as the sampling data based on the sampling data from previous and subsequent machining areas, for areas where the shape of the work to be machined is complex the sampling point are set at shorter intervals, and for simple machining areas the sampling points are set at longer intervals to determine the number of sampling for measurement of a plurality of samplings.

* * * * *